(12) United States Patent
Matsushima et al.

(10) Patent No.: US 7,954,822 B2
(45) Date of Patent: Jun. 7, 2011

(54) WIRE MATERIAL FOR COIL EXPANDER AND COIL EXPANDER

(75) Inventors: Nobuyuki Matsushima, Saitama (JP); Chikako Sasao, Saitama (JP); Takao Suzuki, Aichi (JP)

(73) Assignees: Nippon Piston Ring Co., Ltd., Saitama-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 1228 days.

(21) Appl. No.: 10/585,477

(22) PCT Filed: Jan. 7, 2005

(86) PCT No.: PCT/JP2005/000119
§ 371 (c)(1),
(2), (4) Date: Jul. 7, 2006

(87) PCT Pub. No.: WO2005/066482
PCT Pub. Date: Jul. 21, 2005

(65) Prior Publication Data
US 2009/0243225 A1    Oct. 1, 2009

(30) Foreign Application Priority Data

Jan. 9, 2004  (JP) ................................. 2004-003733

(51) Int. Cl.
*F16J 9/00*  (2006.01)
*B60T 11/236*  (2006.01)

(52) U.S. Cl. ...................... 277/434; 277/467; 277/472

(58) Field of Classification Search .................. 277/434, 277/437, 467, 472
See application file for complete search history.

(56) References Cited

U.S. PATENT DOCUMENTS

| | | | | |
|---|---|---|---|---|
| 3,638,297 A | * | 2/1972 | Ditscherlein | 29/446 |
| 3,893,660 A | * | 7/1975 | Bush | 267/1.5 |
| 4,114,905 A | * | 9/1978 | Mercier | 277/645 |
| 5,542,682 A | * | 8/1996 | Goldstein et al. | 277/589 |
| 6,356,409 B1 | * | 3/2002 | Price et al. | 360/98.07 |
| 6,834,861 B2 | * | 12/2004 | Takizawa et al. | 277/436 |
| 6,860,485 B2 | * | 3/2005 | Masuyama et al. | 277/434 |

FOREIGN PATENT DOCUMENTS

| | | | | |
|---|---|---|---|---|
| JP | 52-1933 | | | 1/1977 |
| JP | 60101247 A | * | | 6/1985 |
| JP | 60-122554 | | | 8/1985 |
| JP | 63-92011 | | | 6/1988 |
| JP | 2(1990)-98262 U | | | 8/1990 |
| JP | 8-29647 | | | 11/1996 |
| JP | 11-230344 | | | 8/1999 |

* cited by examiner

*Primary Examiner* — Vishal Patel
(74) *Attorney, Agent, or Firm* — Ladas & Parry LLP (57) ABSTRACT

A wire material for a coil expander capable of manufacturing a coil expander that is unlikely to cause disadvantages such as abnormal wear and resultant reduction in strength The wire material for a coil expander is used for a coil expander of a combination piston ring having a piston ring and the coil expander for pressing and urging the piston ring outward in the radial direction thereof, wherein a cross-sectional shape thereof is a rectangular shape, and when the coil expander is formed by using the wire material for a coil expander, the surface of the wire material for a coil expander, constituting an outer peripheral surface of the coil expander, is formed into a convex curved shape.

6 Claims, 5 Drawing Sheets

WIRE MATERIAL FOR COIL EXPANDER AND COIL EXPANDER

CROSS-REFERENCE TO RELATED APPLICATIONS

Not Applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

1. Technical Field

The present invention relates to a wire material for manufacturing a piston ring, used for a piston of an internal combustion engine, and more particularly, to a wire material for manufacturing a combination oil ring.

2. Background Art

Piston rings generally include a pressure ring and an oil ring. Examples of such piston ring are: those comprising two particular kinds of rings (one pressure ring and one oil ring); and in a case of a top ring for diesel engine, those comprising a coil expander and the like formed of a heat resistant material, for example, a steel material. Further, in an oil ring, the coil expander is used when the oil ring is arranged into a known two-piece oil ring, etc.

In these piston rings, the oil ring, for example, requires a larger tangential force than the other pressure rings to satisfy its functions, that is, an oil scrapping-off function and an oil controlling function. For this purpose, a surface pressure is increased by narrowing a contact width and reducing a contact area, thereby a sealing property and an oil scraping-off property are enhanced. However, by simply increasing the tangential force, it will be a cause of an increase of a friction. Accordingly, when the tangential force is reduced in order to reduce friction, the functions such as the oil sealing property and the oil controlling function cannot be sufficiently obtained, particularly in a high revolution region.

Under these circumstances, a "variable tangential force ring", which has a low tangential force in a low revolution region and has a high tangential force in a high revolution region, is under study. As a known background art document, Patent Document 1 discloses a technology of an oil ring using a coil expander formed of Ni—Ti based shape memory alloy, in which the coil expander is treated such that it is in a contracted state at low temperature and in an expanded state at high temperature.

As described above, the force of the coil expander for pressing an oil ring outward in the radial direction thereof can be changed depending on temperature by forming the coil expander of the shape memory alloy. Accordingly, it is effective for reducing the friction, as well as improving starting property of an engine. However, the modulus of transverse elasticity of a shape memory alloy material is about 6000 to 9000 MPa when it is in a low temperature phase (martensite phase) and about 20000 MPa in a high temperature phase (austenite phase) in a Ni—Ti based binary system. Since these numerical values are only about ¼ compared to that of a coil expander composed of an ordinarily used steel wire material, a wire material composed of shape memory alloy must be four times as thick as the steel wire material to obtain the same tangential force. In contrast, since the width of recent oil rings tend to be reduced to enhance a following property, it is difficult to put a coil expander formed of shape memory alloy to practical use due to restriction in size.

To overcome these problems, there is proposed a coil expander having a rectangular cross-sectional shape. However, in the coil expander having the rectangular cross-sectional shape, the cross-sectional shape thereof may be deformed into a concave shape, for example, on the outer peripheral surface thereof due to stress such as tangential force, compression, etc. that is caused when the coil expander is bent into a coil shape.

As described above, when the coil expander is deformed into the concave shape, the coil expander locally slides strongly against the inner peripheral groove of an oil ring in which it is disposed. Therefore, a problem arises in that abnormal wear occurs and strength reduction as the result. To prevent the local sliding due to deformation, there is employed a method of using a wire material, whose thickness in the radial direction of a coil expander is made larger, making such wire material into a coil, and then, obtaining sliding surface by subjecting the outer peripheral surface of the wire material to centerless machining. However, the method is not preferable because the material is wasted by the machining and the number of steps is increased by cutting the wire material.

Further, although it is not related to the coil expander, as a technology related to the cross-sectional shape of a spring, Patent Document 2 discloses the cross-sectional shape of a wire material of a coil spring used for a valve gear of an internal combustion engine. In Patent Document 2, a wire material of an inner valve spring is formed into an asymmetric cross-sectional shape, thereby providing the respective portions thereof with different characteristics. Although the valve spring and the coil expander are both arranged into similar spring shape, since they have a thoroughly different purpose of use and function, the technology of the coil spring cannot be applied to the coil expander.

Further, Patent Document 3 discloses a seal ring having a cross-sectional shape composed of curved surfaces having a different curvature. As in the case of the above-described coil expander, this is to cope with the change of the cross-sectional shape caused when a wire material is formed into a ring shape. However, since the seal ring and the coil expander have a quite different purpose of use and function, applied curvature when forming into a coil shape is also quite different, and a different characteristic is required to them. Therefore, the technology disclosed in Patent Document 3 cannot be applied to the coil expander.

Patent Document 1: Japanese Utility Model Application Publication No. 3-41078

Patent document 2: Japanese Utility Model Application Laid-Open No. 63-92011

Patent document 3: Japanese Utility Model Application Laid-Open No. 52-1933

BRIEF SUMMARY OF THE INVENTION

Problems to be Solved by the Invention

The present invention was made in view of the above object, and a main object of the present invention is to provide a wire material for a coil expander capable of manufacturing a coil expander that is unlikely to cause disadvantages such as abnormal wear and resultant reduction in strength, without troublesome job.

Means for Solving the Problems

The present invention was made in view of the above object, and the present invention provides a wire material for a coil expander used for a coil expander of a combination piston ring comprising a piston ring and the coil expander for pressing and urging the piston ring outward in the radial direction thereof, wherein a cross-sectional shape thereof is a rectangular shape, and when the coil expander is formed by using the wire material for a coil expander, the surface of the wire material for a coil expander, constituting an outer peripheral surface of the coil expander, is formed into a convex curved shape.

The wire material for a coil expander of the present invention is processed to the shape described above in consideration of deformation occurs in a portion constituting the outer peripheral surface of the coil expander, when the wire material is bent into a coil shape. Accordingly, when the wire material for a coil expander of the present invention is used, the cross sectional shape thereof can be prevented from being deformed into a concave shape, when it is coiled. Thereby, without subjecting the outer peripheral surface to post treatments such as polishing and cutting, a coil expander which executes surface sliding against, for example, an inner peripheral groove of an oil ring of which the coil expander is disposed can be manufactured. Accordingly, the wire material for a coil expander has an effect of: suppressing occurrence of disadvantages such as abnormal wear and resultant reduction in strength; reducing cost; and improving a manufacturing efficiency.

Further, in the present invention, it is preferable that the height of the curved surface in the surface of the wire material for a coil expander, which is formed into the convex curved surface, is in a range of 0.03 to 0.1 mm. This is because, when using the wire material for a coil expander whose height of the curved surface is in the above range, the shape of the outer peripheral surface of the coil expander, after being formed into a coil shape, is not deformed into the concave shape. Therefore, the shape of the outer peripheral surface can be made into a flat shape, for example, which permits the coil expander to execute surface sliding against the oil ring.

Further, in the present invention, it is preferable that, when the coil expander is formed by using the wire material for a coil expander, the surface of the wire material for a coil expander constituting an inner peripheral surface of the coil expander is formed into a concave curved shape. When a wire material for a coil expander is bent into a coil shape, to the portion of the wire material constituting the inner peripheral surface of the coil expander, a force is applied in a compressing direction. Thereby, the inner peripheral surface of the coil expander may be deformed into the concave shape in some cases. Since such coil expander tends to contact to a core material inserted thereinto only on one side thereof, there is a high possibility of occurrence of wear, breakage, and the like on the inner peripheral surface. Accordingly, in the present invention, the surface of the wire material for a coil expander, which constitutes the inner peripheral surface of the coil expander, is formed into the concave curved shape. Thereby, the deformation of the inner peripheral surface into the convex shape, when the wire material is formed into a coil expander, is prevented, and wear and breakage of the inner peripheral surface can be reduced.

Further, in the present invention, it is preferable that, when the height of the curved surface in the surface of the wire material for a coil expander formed into the convex curved shape is "a" and the height of the curved surface in the surface of the wire material for a coil expander formed into the concave curved shape is "b", a≧b+0.005 mm. By setting the relation between the heights of the curved surfaces in both surfaces formed into the curved shape as described above, the shapes of the outer and inner periphery side surfaces thereof can be made flat when the coil expander is formed. As a result, the coil expander executes surface sliding against, for example, the inner peripheral groove of the oil ring, the core material, etc. so that the amount of wear of the coil expander can be reduced in its entirety.

In the present invention, it is preferable that a radius of curvature of the curved surface of outer periphery side surface edges, located at both ends in a width direction of the wire material for a coil expander, of the surface of the wire material for a coil expander formed into the convex curved shape is smaller than the radius of curvature of the curved surface of an outer periphery side surface midportion located at the central portion in the width direction of the wire material for a coil expander. Since stress can be dispersed by forming the outer periphery side surface edges of the wire material for a coil expander into rounded shape, the strength of the edges can be improved.

Further, in the present invention, it is preferable that a radius of curvature of the curved surface of inner periphery side surface edges, located at both ends in a width direction of the wire material for a coil expander, of the surface of the wire material for a coil expander formed into the concave curved shape is smaller than the radius of curvature of the curved surface of an inner periphery side surface midportion located at the central portion in the width direction of the wire material for a coil expander. The diameter of a joint core material disposed inner side of the coil expander can be increased by forming the inner periphery side surface edges, constituting the inner peripheral surface of the coil expander, into rounded shape.

Further, in the present invention, it is preferable that a side surface of the wire material for a coil expander is flat. The side surfaces having the flat shape can prevent the wire material for a coil expander from being twisted when the coil expander is made by forming the wire material for a coil expander into the coil shape.

Further, in the present invention, it is preferable that the piston ring is an oil ring. This is because friction can be reduced, and a combination oil ring excellent in an oil scrapping-off function and an oil controlling function can be obtained.

Further, in the present invention, it is preferable that the wire material for a coil expander is formed of a shape memory alloy. This is because, since the wire material for a coil expander formed by using the shape memory alloy is particularly greatly deformed by the force, such as the tangential force and the compression force, generated when the wire material is bent into the coil shape, the effect of the present invention can be fully utilized.

The present invention provides a coil expander, wherein the above-described wire material for a coil expander is used to form the coil expander. As described above, in the wire material for a coil expander, deformation when it is formed into a coil expander is previously anticipated. Therefore, disadvantages such as abnormal wear and resultant reduction in strength are unlikely to occur in the coil expander formed by using the wire material for a coil expander, and thus, the coil expander has an effect of reducing cost and simplifying a manufacturing process.

The present invention provides a coil expander used for a combination oil ring comprising an oil ring and the coil expander for pressing and urging the oil ring outward in the radial direction thereof, wherein the coil expander is formed of a shape memory alloy, has a rectangular cross-sectional shape and an outer peripheral surface thereof is flat.

In the present invention, since the coil expander has the rectangular cross-sectional shape and the flat outer peripheral surface, it can execute surface sliding against the inner peripheral groove of the oil ring in which it is disposed. Accordingly, problems such as occurrence of abnormal wear and resultant reduction in strength can be overcome. Thereby, the present invention has an effect of improving the functions of the combination oil ring. Further, since the coil expander is composed of the shape memory alloy, the tangential force can be changed in response to the operating state of an engine. Accordingly, the coil expander can reduce friction in addition to the improvement of the oil scraping-off function and the oil controlling function.

Further, in the present invention, it is preferable that the outer peripheral surface of the coil expander is a plasticity processed surface. Since the coil expander having the flat outer peripheral surface can be obtained without subjecting it to machining such as polishing and cutting after it is formed into a coil, the coil expander has an effect in cost and efficiency with a less amount of wasted material.

EFFECT OF THE INVENTION

The wire material for a coil expander of the present invention can make it possible to easily manufacture a coil expander that is unlikely to cause disadvantages, such as abnormal wear and resultant reduction in strength, without troublesome job.

DETAILED DESCRIPTION OF THE INVENTION

Best Mode for Carrying Out the Invention

A wire material for a coil expander and a coil expander of the present invention will be explained below.

A. Wire Material for Coil Expander

First, a wire material for a coil expander of the present invention will be explained.

The wire material for a coil expander of the present invention is a wire material for a coil expander used for a coil expander of a combination piston ring comprising a piston ring and the coil expander for pressing and urging the piston ring outward in the radial direction thereof, wherein a cross-sectional shape thereof is a rectangular shape, and when the coil expander is formed using the wire material for a coil expander, the surface of the wire material for a coil expander constituting an outer peripheral surface of the coil expander (hereinafter, it may be referred to as an outer periphery side surface) is formed into a convex curved shape.

Figure 1:
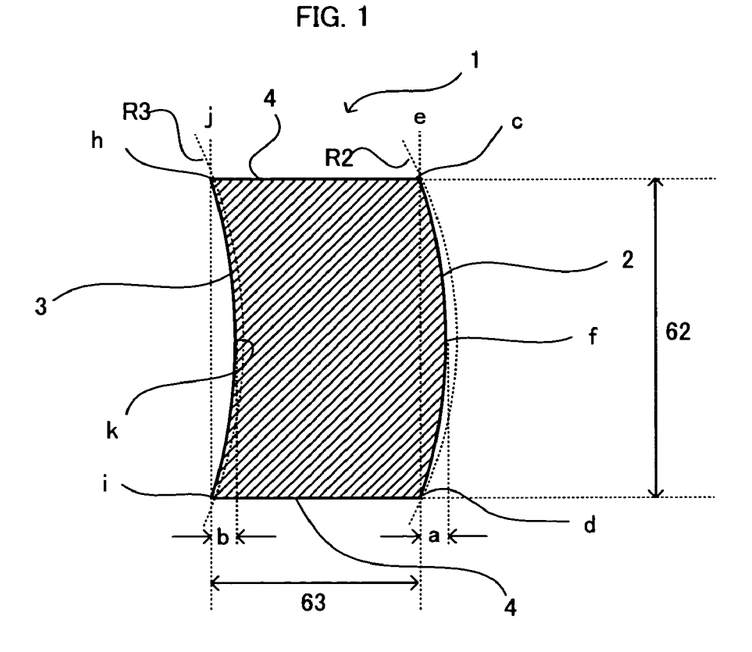
FIG. 1 is a schematic cross-sectional view showing an example of a wire material for a coil expander of the present invention.

Such wire material for a coil expander of the present invention will be explained using drawings. FIG. 1 is a schematic cross-sectional view showing an example of the wire material for a coil expander of the present invention. As exemplified in FIG. 1, the wire material for a coil expander 1 of the present invention is composed of an outer periphery side surface 2, which constitutes an outer peripheral surface of the coil expander when the wire material for a coil expander 1 is formed into a coil shape, a surface 3 which is an inner peripheral surface of the coil expander (hereinafter, it may be referred to as an inner periphery side surface), and two side surfaces 4.

As shown in FIG. 1, the wire material for a coil expander of the present invention is characterized in that the outer periphery side surface 2 thereof is formed into a convex curved surface. The reason for this is as described below. That is, as shown in the explanatory view of FIG. 2 explaining how the wire material for a coil expander of the present invention is bent into a coil shape, when the coil expander is formed by bending the wire material for a coil expander 1 into the coil shape, a force is applied on a portion 10, which constitutes the outer peripheral surface of the coil expander, in a pulling direction so that deformation due to the force is taken into a consideration. That is, by previously anticipating the shape change due to the force, the outer periphery side surface 2 of the wire material for a coil expander 1, which constitutes the outer peripheral surface of the coil expander, is formed into a convex curved surface having a thickness, as shown in FIG. 1. Accordingly, even if tangential force is applied on the wire material for a coil expander 1 when it is bent into the coil shape, deformation into a concave shape can be prevented.

Figure 2:
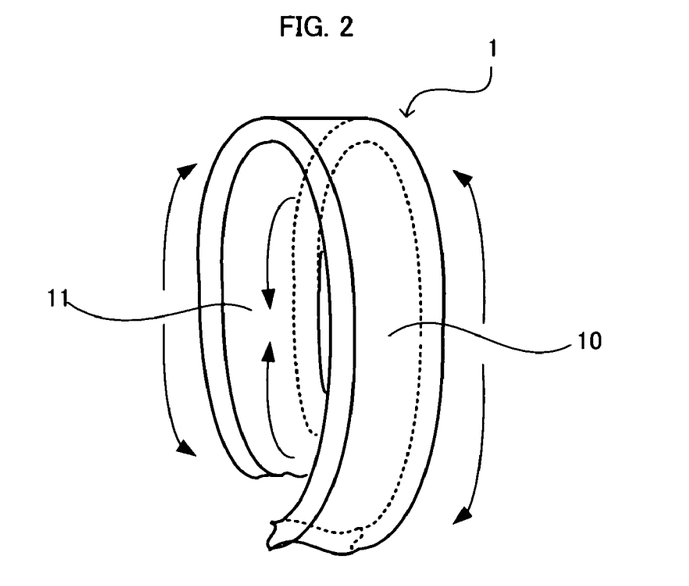
FIG. 2 is an explanatory view showing how the wire material for a coil expander is bent into a coil shape.

Further, as shown in FIG. 2, when the wire material for a coil expander 1 is bent into the coil shape, a force is applied on the inner peripheral surface 11 of the coil expander in a compressing direction. Accordingly, taking the force into the consideration in the wire material for a coil expander 1 of the present invention, by forming the inner periphery side surface 3 to a concave curved shape as shown in FIG. 1, the coil expander having the rectangular cross-sectional shape can be manufacturing.

Figure 3:
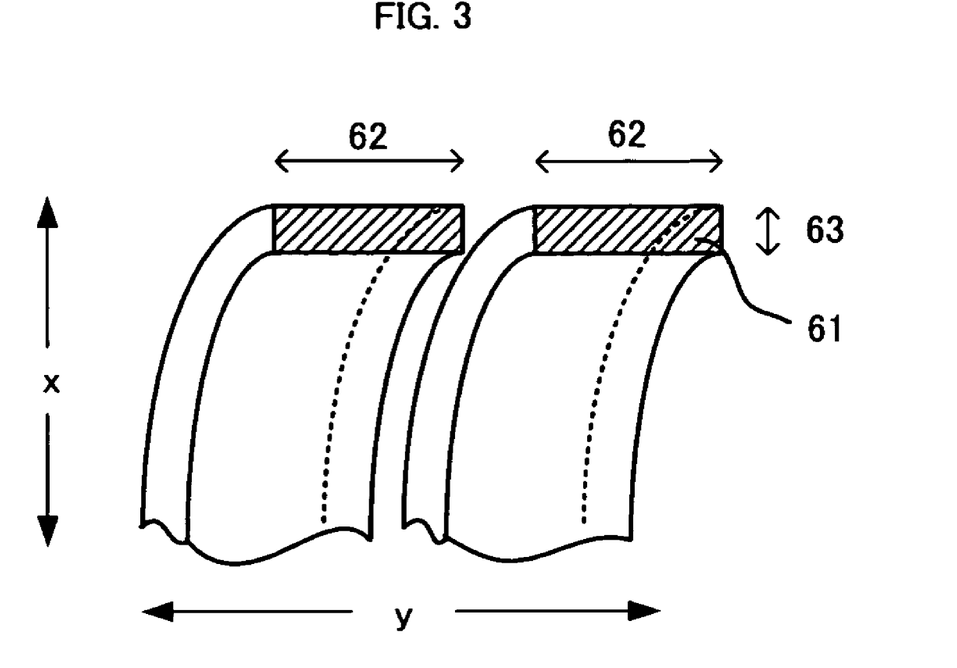
FIG. 3 is an explanatory view explaining a width and a thickness of the wire material for a coil expander of the present invention.

The thickness and the width of the wire material for a coil expander in the present invention will be explained using a figure. FIG. 3 is a schematic cross-sectional view of the coil expander formed by using the wire material for a coil expander described above, that is, a cross-section including an axial direction "y" of the coil expander. The cross-sectional shape 61 of the wire material for a coil expander in FIG. 3 corresponds to the schematic cross-sectional view of the wire material for a coil expander 1 shown in FIG. 1 described above. In the present invention, the thickness of the wire material for a coil expander means the length of the wire material for a coil expander in the radial direction "x" of the coil expander, when the wire material is formed into the coil shape, as shown in FIG. 3. Whereas, the width of the wire material for a coil expander means the length of the wire material for a coil expander, in the axial direction "y" of the coil expander. Specifically, in the cross-sectional shape 61 of the wire material for a coil expander, the length of the coil expander in the radial direction "x" corresponds to the thickness 63 of the wire material for a coil expander, whereas the length of the coil expander in the axial direction "y" corresponds to the width 62 of the wire material for a coil expander.

The wire material for a coil expander of the present invention will be explained below in detail.

The wire material for a coil expander of the present invention is used for a coil expander of a combination piston ring, comprising a piston ring and the coil expander for pressing and urging the piston ring outward in the radial direction thereof, and a cross-sectional shape thereof is a rectangular shape.

The combination piston ring comprising the coil expander made by using the wire material for a coil expander of the present invention is not particularly limited as long as it comprises at least a coil expander formed of the wire material for a coil expander of the present invention and a piston ring. Further, the piston ring used for the combination piston ring in the present invention is preferably an oil ring. This is because the oil ring can sufficiently make use of the effect of the present invention, and a combination oil ring excellent in reduction of friction, an oil scrapping-off function, an oil controlling function, etc. can be obtained. Accordingly, the combination piston ring of the present invention is preferably the combination oil ring. As the combination oil ring, a three-piece oil ring, a four-piece oil ring and the like can be specifically listed, in addition to a two-piece oil ring.

The wire material for a coil expander of the present invention is characterized in that the cross-sectional shape thereof is the rectangular shape, and that when the coil expander is formed, the outer periphery side surface of the wire material for a coil expander, constituting the outer peripheral surface of the coil expander, is formed into the convex curved surface.

In the present invention, the outer periphery side surface of the wire material for a coil expander, constituting the outer peripheral surface of the coil expander, is formed into the convex curved surface, in consideration of the deformation of the wire material for a coil expander caused by the tangential force generated on the outer peripheral surface of the coil expander when the wire material for a coil expander is bent into the coil shape. By doing so, when forming the coil, even if the outer periphery side surface is extended and deformed, it is not deformed into a concave shape. Thus, a problem that the coil expander slides locally against, for example the inner peripheral groove of the oil ring, where it is disposed, can be overcome. Note that, although the rectangular shape referred to here means square, oblong figure, etc., the rectangular shape also includes shapes that can be understood approximately rectangular, such as square and oblong figure, as a whole. Thus, the rectangular shape also includes a shape whose angle or surface is slightly rounded with a curvature.

Further, specifically, in the outer periphery side surface formed into the convex curved shape, the height of the curved surface is not particularly limited as long as it is set to a degree by which the outer periphery side surface is not deformed into the concave shape when the wire material for a coil expander is bent into the coil shape. However, the height is preferably in a range of 0.03 mm to 0.1 mm and more preferably in a range of 0.04 mm to 0.08 mm. This is because when the curved surface is in the above range, the outer peripheral shape of the finally obtained coil expander can be made into a flat shape without being subjected to centerless machining such as cutting. Thereby, the coil expander can execute surface sliding against the inner peripheral groove of the oil ring, where the coil expander is disposed.

Note that the height of the curved surface indicates the degree of bulge of the most bulged portion of the outer periphery side surface formed into the convex curved shape. Specifically, as shown in FIG. 1, the height indicates a distance "a" between a straight line "e" connecting the edges "c" and "d" of the outer periphery side surface formed into the convex curved surface and the apex "f" of the convex curved surface.

Further, the radius of curvature "R" of the curved surface of the outer periphery side surface formed into the convex curved shape is preferably in a range of 0.8 mm to 1.4 mm and more preferably in a range of 0.8 mm to 1.2 mm. The radius of curvature "R" smaller than the above range is not preferable because when the wire material for a coil expander is formed into the coil expander, the shape of the wire material after deformation may be the convex curved shape, and thus, a contact area is reduced. In contrast, the radius of curvature "R" larger than the above range is also not preferable because the wire material may be deformed into the concave shape. The radius of curvature of the outer periphery side surface is the radius of curvature of an arc "R2" shown by a dotted line in FIG. 1.

When the coil expander is made by using the wire material for a coil expander of the present invention, the shape of the inner periphery side surface of the material for a coil expander, which constituting the inner peripheral surface of the coil expander, is not particularly limited. As exemplified in, for example, FIG. 4, the inner periphery side surface 3 may be formed into various shapes such as a flat shape, a concave curved shape, a convex curved shape, etc. Among them, the inner periphery side surface is preferably formed into the concave curved shape in the present invention. When the wire material for a coil expander is bent into the coil shape, although a tangential force is applied on the outer peripheral surface 10 as shown in FIG. 2, a force is applied on the inner peripheral surface 11 in a compressing direction. When the force is applied to the wire material for a coil expander at the time of forming the coil expander, the inner peripheral surface of the coil expander is deformed into the concave shape. Since such coil expander tends to contact to a core material inserted thereinto only on one side thereof, the diameter of the core material must be reduced, in order to be engaged with the core material. Accordingly, in the present invention, by forming the inner periphery side surface of the wire material for a coil expander, which constitutes the inner peripheral surface of the coil expander, into the concave curved shape, the deformation of the inner peripheral surface into the convex shape when it is formed into the coil expander is prevented. Thus, wear and breakage of the inner peripheral surface of the coil expander can be reduced. The radius of curvature of the inner periphery side surface is the radius of curvature of an arc "R3" shown by a dotted line in FIG. 1.

When the inner periphery side surface of the wire material for a coil expander constituting the inner peripheral surface of the coil expander is formed into the concave curved surface as described above, the relation of the height of the curved surface between the outer periphery side surface and inner periphery side surface, formed into the curved shape, is preferably $a \geqq b + 0.005$ mm, wherein the height of the curved surface of the outer periphery side surface formed into the convex curved shape is referred to as "a", and the height of the curved surface of the inner periphery side surface formed into the concave curved shape is referred to as "b".

The outer periphery side surface and the inner periphery side surface that are formed into the curved shape are positioned so as to face each other. This is because the outer periphery side surface formed into the convex curved surface is the portion constituting the outer peripheral surface of the coil expander, and the inner periphery side surface formed into the concave curved surface is the portion constituting the inner peripheral surface of the coil expander. By setting the relation between the heights of the curved surfaces of both the outer and inner periphery side surfaces as described above, when the wire material for a coil expander is formed as the coil expander, the shapes of the outer and inner peripheral surfaces thereof can be made into flat surfaces. As a result, the coil expander executes surface sliding against, for example, the inner peripheral groove of the oil ring, the core material, etc., thereby the amount of wear thereof can be reduced in their entirety.

Note that the height of the curved surface of the inner periphery side surface formed into the concave curved shape described above means the degree of recess in the most concaved portion of the inner periphery side surface formed into the concave curved shape. Specifically, as shown in FIG. 1, the height indicates a distance "b" between a straight line "j" connecting the edges "h" and "i" of the inner periphery side surface formed into the concave curved surface and the apex "k" of the concave curved surface.

Figure 4A:
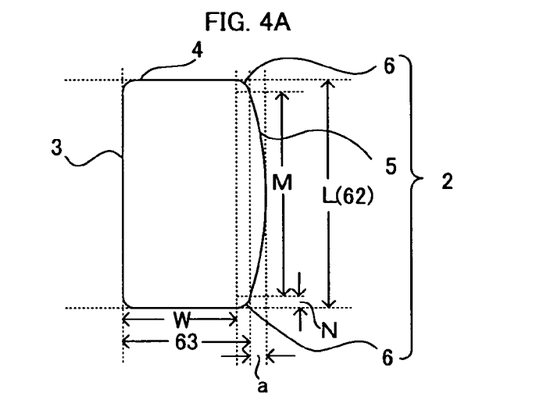
FIG. 4 is a schematic cross-sectional view showing another example of the wire material for a coil expander of the present invention.

Although the wire material for a coil expander of the present invention has the rectangular cross-section, it is preferable that the edges, in a width direction, of the wire material for a coil expander is formed into a rounded shape (refer to FIG. 4). This is because the amount of wear can be reduced by avoiding the local sliding executed at the edges. The rounded shape is not particularly limited. However, it is preferable that the radius of curvature of the curved surface of the outer periphery side surface edge of the surface of the wire material formed into the convex curved shape, located at both ends in a width direction of the wire material for a coil expander, be smaller than the radius of curvature of the curved surface of the outer periphery side surface midportion, located at the central portion in the width direction of the wire material for a coil expander (hereinafter, such shape is referred to as the first embodiment of the wire material for a coil expander). Specifically, as exemplified in FIG. 4A, the portion formed into an overall curved shape as the outer periphery side surface 2 is referred to as an outer periphery side surface mid portion 5, and the curved surface, located at both ends in a width direction of the outer periphery side surface 2, which has a radius of curvature different from that of the outer periphery side surface mid portion 5 is referred to as an outer periphery side surface edge 6.

At the time, concerning the radius of curvatures of each curved surface, the radius of curvature of the outer periphery side surface midportion 5 is preferably in a range of 0.8 mm to 1.4 mm, more preferably in a range of 0.8 mm to 1.2 mm, that is the same as the radius of curvature of the above-described outer periphery side surface 2. Whereas the radius of curvature of the outer periphery side surface edge 6 is preferably in a range of 0.03 mm to 0.2 mm, more preferably in a range of 0.05 mm to 0.1 mm. When the radius of curvature of the outer periphery side surface edge 6 is smaller than the above range, the effect of the rounded shape may not be sufficiently obtained. In contrast, when the radius of curvature is larger than the above range, it may be difficult to machine the outer periphery side surface edge 6 in such shape.

The ratio of the above-described outer periphery side surface edges 6 and the outer periphery side surface midportion 5 that occupy the outer periphery side surface 2 is not particularly limited. However, as shown in FIG. 4A, when the length of the outer periphery side surface 2, that is, the width 62 of the wire material for a coil expander is referred to as "L", the length of the outer periphery side surface midportion 5 is referred to as "M", and the length of the outer periphery side surface edge 6 located at both ends thereof is referred to as "N", respectively, L:M:2N is preferably in a range of 1:0.7 to 0.95:0.05 to 0.3, more preferably L:M:2N is in a range of 1:0.75 to 0.9:0.1 to 0.25.

Further, when the inner periphery side surface of the wire material for a coil expander is formed of the concave curved surface, it is preferable that the radius of curvature of the curved surface of the inner periphery surface side edge of the surface of the wire material for a coil expander formed into the concave curved shape, located at both ends in a width direction of the wire material for a coil expander, be smaller than the radius of curvature of the curved surface of the inner periphery side surface midportion located at the central portion in the width direction of the wire material for a coil expander, as in the case of the outer periphery side surface (hereinafter, such shape is referred to as a second embodiment of the wire material for a coil expander). Note that, in this case, as exemplified in FIG. 4B, the inner periphery side surface midportion 7, which is the portion forming the overall curved shape constituting the inner periphery side surface 3, is formed into the concave curved surface. In contrast, the inner periphery side surface edge 8, located at both ends of the inner periphery side surface 3 and has the radius of curvature different from that of the inner periphery side surface midportion 7, is formed of the convex curved surface. By forming the inner periphery side surface 3 as described above, disadvantages, for example, that a joint core material disposed inner side of the coil expander comes into contact with the edges of the inner periphery side surface 3 of the wire material for a coil expander and is broken thereby can be prevented. Accordingly, even when the coil expander has the same inside diameter, the above joint core material having a diameter larger than a conventional one can be used.

Specifically, the radius of curvature of the inner periphery side surface midportion 7 is preferably in a range of 0.8 mm to 1.4 mm, and more preferably in a range of 0.8 mm to 1.2 mm. Whereas the radius of curvature of the inner periphery side surface edges 8 is preferably in a range of 0.05 mm to 0.2 mm, more preferably in a range of 0.05 mm to 0.1 mm.

Figure 4B:
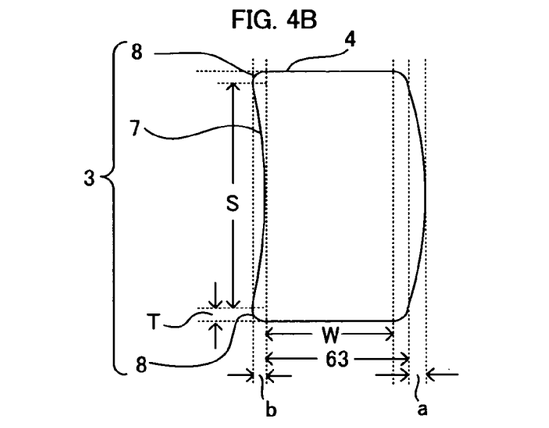

The ratio of the inner periphery side surface edges 8 and the inner periphery side surface midportion 7 that occupy the inner periphery side surface 3 is not particularly limited. However, as shown in FIG. 4B, when the length of the inner periphery side surface 3, that is, the width 62 of the wire material for a coil expander is referred to as "L", the length of the inner periphery side surface midportion 7 is referred to as "S", and the length of the inner periphery side surface edge 8 located at both ends of the inner periphery side surface midportion 7 is referred to as "T", respectively, L:S:2T is preferably in a range of 1:0.7 to 0.95:0.05 to 0.3, more preferably L:S:2T is in a range of 1:0.75 to 0.9:0.1 to 0.25.

Figure 4C:
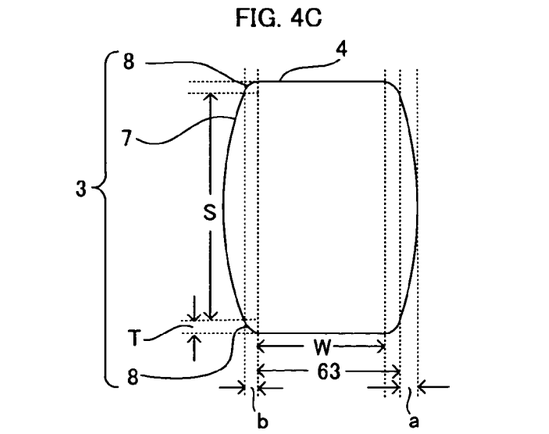

Further, as same as the above-mentioned case, when the inner periphery side surface 3 of the wire material for a coil expander is formed into the convex curved shape as shown in FIG. 4C, the radius of curvature of the curved surface of the inner periphery side surface edge 8 is preferably smaller than the radius of curvature of the curved surface of the inner periphery side surface midportion 7 (hereinafter, such shape is referred to as the third embodiment of the wire material for a coil expander). By forming the inner periphery side surface 3 as described above, since the cross-sectional area of the wire material for a coil expander can be increased, a wire material for a coil expander that can exhibit stronger tangential force can be obtained.

Specifically, the radius of curvature of the inner periphery side surface midportion 8 is preferably in a range of 0.8 mm to 1.4 mm, more preferably in a range of 0.8 mm to 1.2 mm. In contrast, the radius of curvature of the inner periphery side surface edge 7 is preferably in a range of 0.05 mm to 0.2 mm, more preferably in a range of 0.05 mm to 0.1 mm.

The ratio of the inner periphery side surface edges 8 and the inner periphery side surface midportion 7 that occupy the inner periphery side surface 3 is not particularly limited. However, as shown in FIG. 4C, when the length of the inner periphery side surface 3, that is, the width 62 of the wire material for a coil expander is referred to as "L", the length of the inner periphery side surface midportion 7 is referred to as "S", and the length of the inner periphery side surface edge 8 located at both ends of the inner periphery side surface midportion 7 is referred to as "T", respectively, L:S:2T is preferably in a range of 1:0.7 to 0.95:0.05 to 0.3, more preferably L:S:2T is in a range of 1:0.75 to 0.9:0.1 to 0.25.

As described above, when the edges of the outer periphery side surface and/or the inner periphery side surface have the rounded shape, the height "a" of the curved surface of the outer periphery side surface described above is set to the height of the outer periphery side surface midportion, and the height "b" of the curved surface of the inner periphery side surface is set to the height of the inner periphery side surface midportion. That is, in the above-mentioned shape in which the edges of the outer periphery side surface are not rounded, the height "a" is 'a distance between a straight line connecting the edges (edges "c" and "d" in FIG. 1) of the outer periphery side surface and the apex of the curved surface (apex "f" in FIG. 1)'. In contrast, when the edges of the outer periphery side surface are rounded, the height "a" is a distance between a straight line connecting the edges of the outer periphery side surface midportion and the apex of the curved surface, irrespectively of the shape of the outer periphery side surface edges. For example, as indicated as height "a" in FIG. 4. Similarly, the height "b" of the curved surface of the inner periphery side surface is a distance between a straight line connecting the edges of the inner periphery side surface midportion and the apex of the curved surface, for example, as indicated as height "b" in FIG. 4.

In the present invention, the side surfaces of the wire material for a coil expander preferably have a flat shape. By making the side surfaces in flat shape, a twisting of the wire material for a coil expander, when the coil expander is made by forming the wire material for a coil expander into the coil shape, can be prevented. At the time, although the length of the flat side surfaces is not particularly limited, when the length of the side surfaces is referred to as "W", as exemplified in FIG. 4, "W" is preferably in a range of 0.3 mm to 0.8 mm. Further, the length "W" of the side surfaces 4 is preferably in a range of 35% to 80% of the thickness 63 of the wire material for a coil expander shown in FIG. 4 and the like. By setting the value and the ratio of "W" in the above ranges, the twisting of the wire material for a coil expander can be more securely prevented.

A material for forming the wire material for a coil expander is not particularly limited as long as it is an ordinarily used material. For example, a titanium material, an aluminum material, shape memory alloy and the like can be listed in addition to steels such as valve spring steel, tool steel, stainless steel. Among the above materials, the shape memory alloy is more preferable. Since the shape memory alloy, among the above-mentioned metals, is high in flexibility and is particularly greatly deformed by the force, such as a tangential force and a compression force, generated when it is bent into the coil shape, it can sufficiently make use of the effect of the present invention. Further, since the tangential force can be changed in correspondence to the operating state of an engine by using the shape memory alloy, when, for example, the combination piston ring in the present invention is arranged as the combination oil ring, friction can be reduced in addition to improvement of an oil scraping-off function and an oil controlling function.

A case in which the wire material for a coil expander of the present invention is formed of the shape memory alloy will be explained.

In general, a shape memory alloy is in a martensite state (M phase) at room temperature and is transforms to an austenite state (A phase) at high temperature. Transformation from the martensite state to the austenite state is called reverse martensitic transformation, and transformation from the austenite state to the martensite state is called martensitic transformation. Hereinafter, the temperature at which the transformation occurs will be called a martensitic transformation temperature. The martensitic transformation temperature has a certain width of temperature and is determined from the peaks of endothermic reaction and exothermic reaction by differential thermal analysis.

Such shape memory alloy has an shape memory effect, that is, a phenomenon that the alloy returns to its original shape by heating to a particular temperature (for example, the martensitic transformation temperature −10° C. to 100° C. in, for the Ti—Ni system) or higher, after deforming the alloy and removing the load at the martensitic transformation temperature or lower.

In the present invention, in the coil expander formed by using the wire material for a coil expander of the present invention, utilizing such shape memory effect, it is preferable that the wire material for a coil expander is treated so that the coil expander extends in its lengthwise direction when the temperature of the coil expander itself is higher than the martensitic transformation temperature. The reason of this will be explained in "B. Coil Expander" to be described later.

Specifically, the Ti—Ni system, the Cu—Zn—Al system, the Fe—Mn—Si system, etc. can be exemplified as the shape memory alloy that can be used for the wire material for a coil expander of the present invention. Among them, Ti—Ni is most preferable in the present invention. This is because Ti—Ni is most excellent from the view point of strength, fatigue resistance, and corrosion resistance.

When a shape memory alloy composed of Ti—Ni is used, its ratio is preferably Ti-50 atomic % Ni to Ti-51 atomic % Ni.

In the present invention, the martensitic transformation temperature is preferably in a range of −10° C. to 200° C., and, for the Ti—Ni system, for example, it is preferably in a range of −10° C. to 100° C. and more preferably in a range of 30° C. to 90° C. The martensitic transformation temperature can be changed by the composition of shape memory alloy, a heat treatment carried out when shape memory alloy is made and the like. In the coil expander formed by using the wire material for a coil expander of the present invention, by adjusting the martensitic transformation temperature in the above range, martensitic transformation occurs in the coil expander and sufficient tangential force can be obtained at the temperature, at which a surface pressure is demanded to an extent that the function of the combination oil ring, for example, is sufficiently exhibited.

In the wire material for a coil expander composed of the shape memory alloy of the present invention, the ratio of thickness and width of the cross-sectional shape thereof is preferably in a range of 1:1 to 1:4, more preferably in a range of 1:2 to 1:3.5, and particularly preferably in a range of 1:2.5 to 1:3. When the width is longer than the above range, it is not preferable because it may be difficult to bend the wire material at a predetermined curvature due to the narrow gaps between adjacent wire materials, when the coil expander is made at a certain pitch. In contrast, when the width is shorter than the above range, it is also not preferable because when the wire material is coiled at a certain pitch, a sufficient tangential force may not be obtained due to the large intervals formed between adjacent wire materials.

Note that the pitch referred to here means the length from the center of a wire material for a coil expander to the center of an adjacent wire material in one rotation of the wire material, when it is coiled into the coil shape. This will be explained in detail in "B. Coil Expander" to be described bellow.

Figure 5:
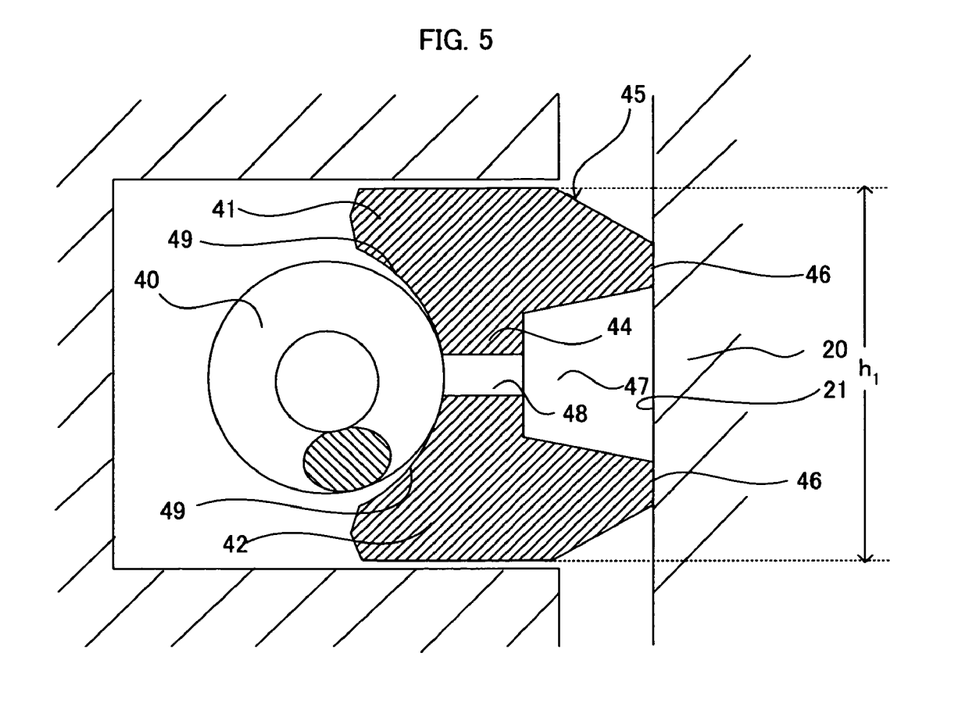
FIG. 5 is a schematic cross-sectional view of a combination oil ring comprising an example of a coil expander of the present invention.

Further, in the wire material for a coil expander formed of shape memory alloy of the present invention, when it is used in the combination oil ring, comprising a thinned oil ring, whose width h1 shown in FIG. 5 is 2 mm or less, the thickness of the wire material is preferably in a range of 0.2 mm to 0.5 mm and more preferably in a range of 0.25 mm to 0.3 mm. When the thickness is thinner than the above range, it is not preferable because when the wire material is formed into the coil expander, reactive force as a spring will be weakened and sufficient tangential force may not be obtained. On the other hand, when the thickness is thicker than the above range, it is not preferable because the wire material may not be formed into a coil expander of a certain diameter.

B. Coil Expander

Next, the coil expander of the present invention will be explained. The coil expander of the present invention can be classified into two embodiments. The coil expander of the present invention will be explained below by classifying it into the first embodiment and the second embodiment.

1. First Embodiment

The coil expander of this embodiment is characterized in that it is formed using the wire material for a coil expander described above.

As described above, since the above-described wire material for a coil expander is formed by previously taking the deformation thereof, occurs when it is formed into the coil expander, into consideration, the coil expander having a flat outer peripheral shape can be obtained without the need of a post treatment such as polishing and cutting, after the wire material is coiled. Accordingly, disadvantages such as abnormal wear and reduction in strength are unlikely to occur in the coil expander made using the wire material for a coil expander described above, thereby it is possible to reduce cost and to simplify a manufacturing process.

A combination oil ring using an example of the coil expander of the embodiment will be explained using a drawing. FIG. 5 is a schematic cross-sectional view illustrating an example of the combination oil ring using the coil expander of the embodiment. The combination oil ring in the embodiment comprises a coil expander 40 made using the wire material for a coil expander described above and an oil ring 45 formed by coupling two rails 41, 42 through a columnar web 44 and having an approximately I-shaped cross section.

A sliding surface 46 of an oil ring 45 slides on an inner wall 21 of a cylinder bore 20. Further, an outer peripheral groove 47 formed by coupling the rails 41, 42 through the web 44 is a groove for accommodating a lubricant oil scraped off by the sliding surface 46 from the cylinder inner wall 21, and further, the lubricant oil accommodated in the outer peripheral groove 47 migrates to the inner periphery side of the oil ring 45 passing through a multiplicity of oil pores 48 formed into the web 44.

Further, in an inner peripheral groove 49 formed on an inner peripheral side by coupling the rails 41, 42 through the columnar web 44, the coil expander 40, which urges the oil ring 45 outward in the radial direction of the oil ring 45 and presses the oil ring 45 against the cylinder inner wall 21, is disposed. In the embodiment, the coil expander 40 is made using the wire material for a coil expander described above. When the coil expander is made, the outer peripheral surface and the inner peripheral surface thereof are deformed due to the application of forces such as a tangential force and a compression force generated when the wire material is bent into a coil shape. However, since the wire material for a coil expander described above is formed into a shape in consideration of the deformation, the coil expander having a rectangular cross-sectional shape can be formed.

Further, in the embodiment, in a case the wire material for a coil expander described above is composed of the shape memory alloy, when the temperature of the coil expander itself exceeds the martensitic transformation temperature, the modulus of transverse elasticity of the coil expander material is greatly changed, thereby a spring anti-force (tangential force) as the coil expander is greatly changed. Specifically, in Ni—Ti shape memory alloy, the modulus of transverse elasticity is 6000 to 9000 MPa in a low temperature phase (martensite phase) and about 20000 MPa in a high temperature phase (austenite phase), and thus, the tangential force variation as the coil expander is about 2 to 3 times larger.

That is, when an engine starts up, since the temperature of the engine and the like is lower than the martensitic transformation temperature, the coil expander has a low tangential force based on a low modulus of transverse elasticity, thereby the sliding friction between the piston ring and the cylinder bore can be reduced, and friction of a sliding surface occurs during the engine warming-up state can be reduced.

Further, when the engine revolution is high, or when the engine is under high load and engine temperature is high, since the temperature of the engine and the like is higher than the martensitic transformation temperature, the coil expander has a high tangential force based on the modulus of transverse elasticity at the high temperature, thereby the function of the oil ring can be exhibited while keeping a gas sealing property and an oil sealing property in a good state.

The coil expander of the embodiment having the above advantages is made using the wire material for a coil expander described above. Further, since the material for forming the wire material for a coil expander described above is preferably the shape memory alloy, the coil expander of the embodiment is preferably composed of the shape memory alloy.

A case in which the coil expander of the embodiment is composed of the shape memory alloy will be explained below.

As described above, the shape memory alloy has an shape memory effect, that is, a phenomenon that the alloy returns to its original shape by heating to a particular temperature (for example, the martensitic transformation temperature $-10°$ C. to $100°$ C. in, for the Ti—Ni system) or higher, after deforming the alloy and removing the load at the martensitic transformation temperature or lower. In such shape memory effect, the temperature at which the alloy returns to a previously memorized shape is referred to as the martensitic transformation temperature.

In the embodiment, utilizing such shape memory effect, it is preferable to treat the coil expander such that when the temperature of the coil expander itself exceeds the martensitic transformation temperature, a desired tangential force can be obtained. The coil expander is subjected to a memory treatment in consideration of a margin of contraction so that a desired tangential force can be obtained in the high temperature phase (austenite phase). When the coil expander is set as the piston ring, since both ends of the coil expander are abutted against each other as abutment joint, it is set to the piston in elastic state. Although the tangential force is in a low state as described above when the engine starts up, when an engine temperature increases, the tangential force is high as described above. That is, since both ends of the coil expander are fixed at both the high and low temperatures as the coil expander, the tangential force thereof is changed by the change of the modulus of transverse elasticity while the coil expander remains in the elastic state. When the engine starts up, since the temperatures of the lubricant oil and the engine gradually increase, these temperatures are low and the lubricant is in a high viscosity state, as compared with a case that the engine is sufficiently operated after some time since it is started. Further, the temperatures at the time are lower than the martensitic transformation temperature in the embodiment. An ordinary coil expander exhibits similar tangential force at engine start and when the engine is sufficiently driven. Accordingly, at the engine starts, the starting property of the engine is deteriorated by, for example, the excessive function of an oil ring. In the embodiment, however, since the temperatures of the engine and the like are lower than the martensitic transformation temperature at the start-up of the engine, the coil expander does not extend in its lengthwise direction and does not exhibit a sufficiently tangential force. Accordingly, the coil expander has an effect of improving the starting property of the engine because the surface pressure of the oil ring is not increased to such a degree as to deteriorate the starting property.

In contrast, when the engine is driven sufficiently, a somewhat high degree of surface pressure is desired in, for example, the oil ring to obtain the oil scraping-off function and the oil controlling function. When the temperature of the coil expander itself exceeds the martensitic transformation temperature as the temperature of the engine increases, the coil expander returns to the memorized state, thereby the reactive force of the coil expander as the spring is increased, so that the tangential force thereof can be increased. As a result, the oil ring can obtain the surface pressure so as to sufficiently exhibit the functions thereof. From the reasons as described above, it is preferable in the embodiment that the coil expander is treated so as to return to its memorized state when the temperature of the coil expander itself exceeds the martensitic transformation temperature.

Further, when the coil expander of the embodiment is used in a size that h1 shown in FIG. 5 is 2.0 mm or less, for example, the tangential force of the coil expander before the martensitic transformation (at low temperature phase) is preferably in a range of 1N to 30N, and more preferably in a range of 1N to 15N. This is because, since the engine is in the warming-up state and the temperature of the engine gradually increases, before the martensitic transformation, the coil expander having the tangential force in the above range can improve the starting property of the engine.

Further, when the combination piston ring of the present invention is arranged as, for example, the combination oil ring, the tangential force after the martensitic transformation (at high temperature phase) is not particularly limited as long as it does not deteriorate the function of the oil ring. Specifically, when the coil expander is used in a size that h1 shown in FIG. 5 is 2.0 mm or less, the tangential force is preferably in a range of 3N to 40N, and more preferably in a range of 3N to 20N. This is because, although reduction of the surface pressure of the oil ring is generally effective in order to reduce friction, the friction can be reduced by adjusting the tangential force of the coil expander after the martensitic transformation in the above range, thereby a fuel consumption can be improved.

Further, since the material for forming the coil expander of the embodiment and the martensitic transformation temperature are the same as those described in "A. Wire Material for Coil Expander", the explanation thereof is omitted.

Further, since the coil expander of the embodiment is made using the wire material for a coil expander described above, the cross-sectional shape thereof can be made to the rectangular shape. For this reason, even when the coil diameter of the coil expander is reduced to such a size as to permit it to be disposed in an inner peripheral groove of a thinned oil ring, the coil expander can exhibit a sufficient tangential force. Accordingly, a problem of insufficient tangential force in the coil expander composed of shape memory alloy can be overcome.

Figure 6:
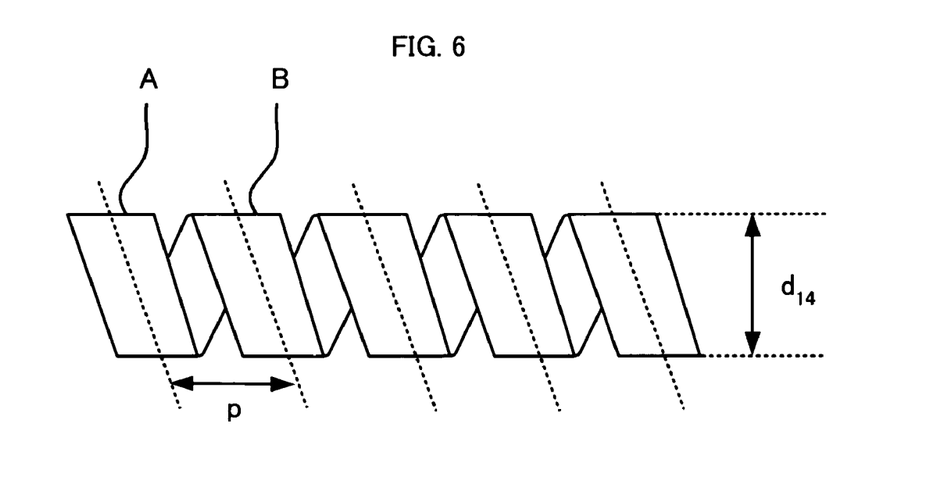
FIG. 6 is an explanatory view explaining the coil expander of the present invention.

Further, when the coil expander of the embodiment is made using the wire material for a coil expander described above, a pitch at which the wire material is bent into the coil state is determined approximately in a predetermined range according to the coil diameter of the coil expander. Note that the pitch referred to here means the length from the center of a wire material to the center of an adjacent wire material in one rotation of the wire material when it is coiled to the coil shape. Specifically, as shown in FIG. 6, within one rotation of the wire material from a position "A" to a position "B", the pitch means an interval "p" from the center of the wire material at the poison "A" to the center of the wire material at the position "B". Further, the coil diameter of the coil expander referred to here means the outermost length of the lengths in the radial direction of the coil expander. Specifically, it means a coil diameter "d14" shown in FIG. 6. Specifically, for example, in the coil expander used in a size that h1 shown in FIG. 5 is 2.0 mm or less, the coil diameter is preferably in a range of 0.3 mm to 1.8 mm, and more preferably in a range of 0.3 mm to 1.4 mm. This is because the coil diameter in the above range can be applied to the thinned oil ring. When the coil diameter of the coil expander is in the above range, the pitch is approximately prescribed in a range of 0.3 mm to 1.8 mm, preferably in a range of 0.3 mm to 1.4 mm for the coil expander, for example, used in a size that h1 is 2.0 mm or less. Further, it is preferable that the pitch is arranged uniformly.

Further, as a method of coiling the above-described wire material for a coil expander into the coil shape to form the coil expander, it is preferable to coil it such that the long sides of the cross-sectional shape of the wire material for a coil expander form the circumferential direction of the coil expander. This is because, since such coiling method minimizes the coil diameter of the coil expander as well as sufficient reactive force as a spring can be exhibited, a desired tangential force can be obtained.

2. Second Embodiment

A coil expander of this embodiment is a coil expander used for a combination oil ring comprising an oil ring and the coil expander for pressing and urging the oil ring outward in the radial direction thereof, wherein the coil expander is formed of a shape memory alloy, has a rectangular cross-sectional shape and an outer peripheral surface thereof is flat.

In the embodiment, since the coil expander has the rectangular cross-sectional shape and the flat outer peripheral surface, the coil expander can execute surface sliding against the inner peripheral groove of the oil ring in which it is disposed. Accordingly, the coil expander can overcome disadvantages such as occurrence of abnormal wear, resultant reduction in strength, etc., and thus has an effect of improving the function of the combination oil ring. Further, since the coil expander is formed of the shape memory alloy, the tangential force can be changed in response to the operating state of an engine. Accordingly, the coil expander can reduce friction in addition to the improvement of an oil scraping-off function and an oil controlling function. In such coil expander arranged as described above, the outer peripheral surface thereof is preferably a plasticity processed surface. The plasticity processed surface referred to here means a surface that is not subjected to machining such as polishing and cutting. In the embodiment, by making the outer peripheral surface as the plasticity processed surface, the coil expander having the flat outer peripheral surface can be obtained without subjecting it to machining, such as polishing and cutting, after it is coiled. As a result, the coil expander has an effect in cost and efficiency with a less amount of wasted material.

A wire material for forming the coil expander is preferably a wire material which can make the outer peripheral surface of the coil expander flat without the need of machining, such as polishing and cutting, even if it is deformed due to a force such as tangential force and compression force when it is bent into a coil shape. Specifically, such coil expander can be formed by using the above-described wire material for a coil expander described above.

Note that the present invention is by no means limited to the embodiments described above. The embodiments described above are only examples, and any embodiments that have substantially the same arrangement and the same effect as the technical spirit disclosed in the appended claims of the description are encompassed within the technical scope of the present invention.

EXAMPLES

The present invention will be specifically explained below with reference to examples and comparative examples. First, a sliding property confirmation test was carried out by a method shown below. Coil expanders were made by using a wire material for a coil expander whose cross-sectional shapes of the outer periphery side surface, which will be outer periphery surface of the coil expander, is as shown in the following Table 1. The obtained coil expanders were assembled into oil rings, and a rig test thereof was carried out as shown in FIG. 7.

Specification of Oil Ring
Material 17 Cr material
Dimensions d1: 79 mm, h1: 1.5 mm, rail width: 0.2 mm
Specification of Coil Expander
Material Ti-50 atomic % Ni material
As the dimensions of the wire material for a coil expander used, the size 63 shown in FIG. 4 was set to 0.3 mm, the size 62 was set to 0.85 mm, and the size d14 shown in FIG. 6 was set to 1.1 mm.

Figure 7:
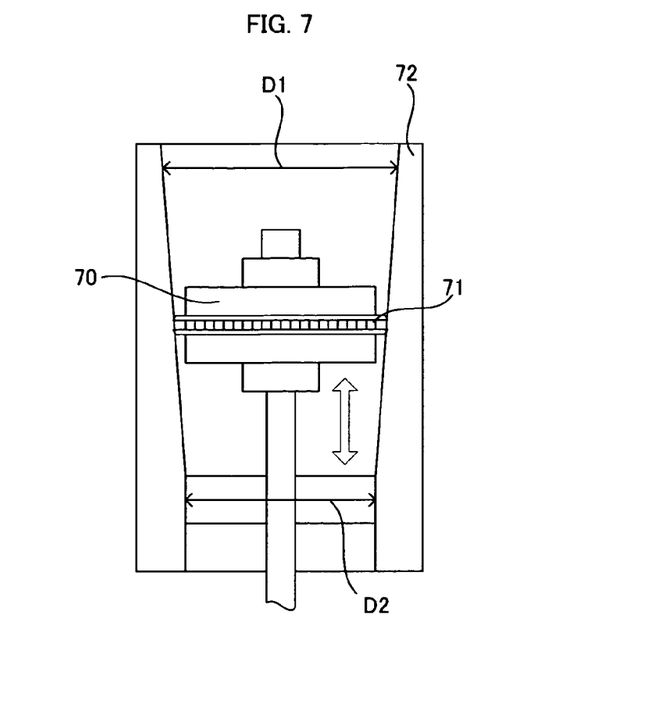
FIG. 7 is an explanatory view showing how a sliding property confirmation test was carried out in examples.

(Testing Procedure)
In the rig test shown in FIG. 7, diameter D1 was set to $\phi$82 mm, a diameter D2 was set to $\phi$79 mm, and the number of revolution was set to 700 rpm. An oil ring 71 was installed in a piston 70, and this was disposed in a cylinder bore 72. The rotation of a motor (not shown) was converted into the stroke (up/down movement) of the piston 70, and according to this up/down movement, the oil ring 71 was repeatedly expanded and contracted between $\phi$82 mm and $\phi$79 mm.

After the oil ring 71 was slid in the cylinder bore 72 for $5 \times 10^5$ times, the coil expander was removed therefrom and the sliding property thereof was confirmed. At the time, "sliding surface position of coil expander" and "sliding surface size of coil expander" were confirmed with a magnifying glass. The sliding surface size was calculated from its area and evaluated as shown in Table 1.

TABLE 1

| | Cross-sectional shape of wire material for a coil expander | | | | | | | |
|---|---|---|---|---|---|---|---|---|
| | Shape of outer periphery side surface | Radius of curvature of outer periphery side surface (mm) | Height "a" of outer periphery side surface (mm) | Length "M" of outer periphery side surface midportion (mm) | Radius of curvature of outer periphery side surface edge (mm) | Sliding surface position of coil expander | Sliding surface size of coil expander | Evaluation | Remarks |
| Example 1 | convex | 0.8 | 0.1 | 0.94 | — | entire surface sliding | medium large | ○ | |
| Example 2 | convex | 1.0 | 0.065 | 0.94 | — | entire surface sliding | large | ○ | rig test |
| Example 3 | convex | 1.2 | 0.03 | 0.70 | — | entire surface sliding | medium large | ○ | |
| Example 4 | convex | 1.0 | 0.065 | 0.94 | — | entire surface sliding | large | ○ | rig test inner periphery concave (a − b = 0.005) |
| Example 5 | convex | 1.2 | 0.03 | 0.70 | — | entire surface sliding | medium large | ○ | inner periphery concave (a − b = 0.01) |
| Example 6 | convex | 0.7 | 0.123 | 0.94 | — | midportion sliding | medium large | Δ | rig test |
| Example 7 | convex | 1.5 | 0.025 | 0.70 | — | both edges sliding | medium | Δ | rig test |
| Example 8 | convex | 0.8 | 0.1 | 0.94 | 0.03 | entire surface sliding | medium large | ○ | rig test, 1st embodiment |
| Example 9 | convex | 1.0 | 0.065 | 0.94 | 0.07 | entire surface sliding | large | ○ | rig test, 1st embodiment |
| Example 10 | convex | 0.8 | 0.1 | 0.94 | 0.05 | entire surface sliding | medium large | ○ | rig test, 2nd embodiment (a − b = 0.005) |

TABLE 1-continued

Cross-sectional shape of wire material for a coil expander

| | Shape of outer periphery side surface | Radius of curvature of outer periphery side surface (mm) | Height "a" of outer periphery side surface (mm) | Length "M" of outer periphery side surface midportion (mm) | Radius of curvature of outer periphery side surface edge (mm) | Sliding surface position of coil expander | Sliding surface size of coil expander | Evaluation | Remarks |
|---|---|---|---|---|---|---|---|---|---|
| Example 11 | convex | 1.0 | 0.065 | 0.94 | 0.07 | entire surface sliding | large | ○ | rig test, 2nd embodiment (a − b = 0.005) |
| Example 12 | convex | 0.8 | 0.1 | 0.94 | 0.03 | entire surface sliding | medium large | ○ | rig test, 3rd embodiment |
| Example 13 | convex | 1.0 | 0.065 | 0.94 | 0.07 | entire surface sliding | large | ○ | rig test 3rd embodiment |
| Comparative Example | square | ∞ | 0 | — | — | both edges sliding | very small | × | rig test |

Note that, in Table 1, radius of curvature of outer periphery side surface (mm) shows the radius of curvature of the outer periphery side surface of the wire materials for a coil expander that were used (in the examples 8 to 13 whose outer periphery side surfaces have rounded edges, the above radius of curvature is the radius of curvature of the outer periphery side surface midportion). Shown by "a" (mm) is the height of the curved surface of the outer periphery side surface of the wire materials for a coil expander (in examples 8 to 13, the height of the outer periphery side surface midportion).

Note that since the inner periphery side surfaces of examples 4, 5, 10, and 11 are formed into a concave curved shape, the difference between the height "a" of the outer periphery side surface and the height "b" of the inner periphery side surface is shown in the remarks column. Further, in examples 12 and 13, the inner periphery side surfaces thereof have a convex curved shape likewise the outer periphery side surfaces thereof. In addition to the above, in examples 8 to 13 whose outer periphery side surfaces have rounded edges, the embodiments of the cross-sectional shapes thereof (embodiment 1 to embodiment 3, refer to FIGS. 4A to 4C) are shown in the remarks column. For the radius of curvature of the outer periphery side surfaces and the outer periphery side surface edges, the values "a" and the values "M" were determined from a measurement chart using a shape measurement.

Figure 8:
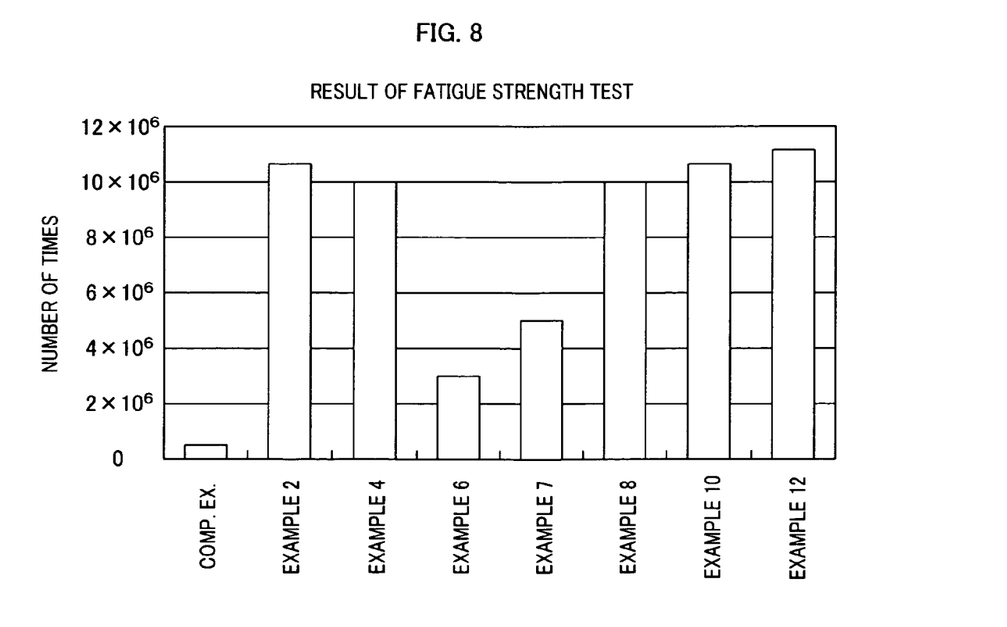
FIG. 8 is a graph showing the results of fatigue strength in the examples.

Further, a fatigue test was carried out to examples 2, 4, 6, 7, 8, 10, and 12, whose sliding surface is entire surface and the sliding surface area is large, and comparative example. FIG. 8 shows the results of the test.

(Evaluation)

It can be found from the results shown in Table 1 that, in each example of 1 to 5 and 8 to 13, the sliding surface between the outer peripheral surface of the coil expander and the oil ring is increased and thus local sliding can be eliminated, by forming the outer periphery side surface of the wire material for a coil expander to the convex shape, setting the radius of curvature of the outer periphery side surface in a range of 0.8 mm to 1.4 mm, and further setting the height "a" of the outer periphery side surface in a range of 0.03 mm to 0.1 mm.

Further, it can be found from the results shown in FIG. 8, the fatigue strength of examples 2, 4, 8, 10, and 12 is greatly larger than that of the comparative example. Further, it can be found that the fatigue strength of the above examples are enormously improved as compared with the example 6, in which only the radius of curvature of the outer periphery side surface is smaller than that of the examples 2 and 4, and with the example 7, in which the radius of curvature of the outer periphery side surface and the height "a" of the outer periphery side surface are larger than those of the examples 2 and 4.

From the results described above, it can be found that the effect of suppressing the local sliding can be obtained by forming the outer periphery side surface of the wire material for a coil expander to the convex shape. Further, the sliding surface between the outer peripheral surface of the coil expander and the oil ring can be more increased by setting the radius of curvature of the outer periphery side surface in a range of 0.8 mm to 1.4 mm and further setting the height "a" of the outer periphery side surface in a range of 0.03 mm to 0.1 mm. Still more, the above is also effect for improving the fatigue strength.

REFERENCE NUMERALS

1 . . . wire material for coil expander
2 . . . outer periphery side surface
3 . . . inner periphery side surface
4 . . . side surface

The invention claimed is:

1. A wire material,
wherein a cross-sectional shape of the wire material is a generally rectangular shape comprising two flat surfaces at the shorter sides, a convex curved surface at one longer side and a concave curved surface at another longer side,
when the coil expander is formed by coiling the wire material, the convex curved surface of the wire material is deformed to be a flat surface constituting an outer peripheral surface of the coil expander,
when the coil expander is formed by coiling the wire material, the concave curved surface of the wire material is deformed to be a flat surface constituting an inner peripheral surface of the coil expander,
a height "a" of the convex curved surface, which is a distance between a straight line connecting outer edges of the two flat surfaces and an apex of the convex curved surface,
a height "b" of the concave curved surface, which is a distance between a straight line connecting outer edges of the two flat surfaces and an apex of the concave curved surface,
when the height, in the surface of the wire material, of the convex curved surface is "a" and the height, in the surface of the wire material, of the concave curved surface is "b", $a \geq b + 0.005$ mm, the height "a" of the convex curved surface is in the range of 0.03 to 0.1 mm, and the wire material is formed of a shaped memory alloy.

2. The wire material according to claim 1, wherein a radius of curvature of the convex curved surface edges, located at both ends in a width direction of the wire material, is smaller than the radius of curvature of the convex curved surface midportion located at the central portion in the width direction of the wire material.

3. The wire material according to claim 1, wherein a radius of curvature of the concave curved surface edges, located at both ends in a width direction of the wire material, is smaller than the radius of curvature of the concave curved surface midportion located at the central portion in the width direction of the wire material.

4. The wire material according to claim 1, wherein the coil expander formed by coiling the wire material is used for a combination oil ring.

5. A coil expander, wherein the wire material according to claim 1 is used to form the coil expander.

6. The coil expander according to claim 5, wherein the outer peripheral surface of the coil expander is a plasticity processed surface.

* * * * *